United States Patent
Rösseler et al.

(10) Patent No.: US 10,753,421 B2
(45) Date of Patent: Aug. 25, 2020

(54) DAMPING VALVE DEVICE HAVING A PROGRESSIVE DAMPING-FORCE CHARACTERISTIC CURVE

(71) Applicant: ZF FRIEDRICHSHAFEN AG, Friedrichshafen (DE)

(72) Inventors: Jörg Rösseler, Ruppichteroth (DE); Aleksandar Knezevic, Eitorf (DE); Benjamin Thiessen, Fürthen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 33 days.

(21) Appl. No.: 16/310,331

(22) PCT Filed: May 15, 2017

(86) PCT No.: PCT/EP2017/061554
§ 371 (c)(1),
(2) Date: Dec. 14, 2018

(87) PCT Pub. No.: WO2017/215858
PCT Pub. Date: Dec. 21, 2017

(65) Prior Publication Data
US 2019/0128361 A1    May 2, 2019

(30) Foreign Application Priority Data

Jun. 16, 2016    (DE) .................... 10 2016 210 790

(51) Int. Cl.
*F16F 9/512*    (2006.01)
*F16F 9/348*    (2006.01)
*F16F 9/19*    (2006.01)

(52) U.S. Cl.
CPC .......... *F16F 9/5126* (2013.01); *F16F 9/3485* (2013.01); *F16F 9/512* (2013.01);
(Continued)

(58) Field of Classification Search
CPC .......... F16F 9/5126; F16F 9/19; F16F 9/3485; F16F 2228/14
See application file for complete search history.

(56) References Cited

U.S. PATENT DOCUMENTS 6,450,541 B1 *   9/2002   Bakke .................... E21B 17/06
                                                            285/2
2002/0000351 A1   1/2002   Valembois
(Continued)

FOREIGN PATENT DOCUMENTS

DE           29 32 245           2/1981
DE       10 2004 050 732         6/2005
(Continued)

*Primary Examiner* — Vishal R Sahni
(74) *Attorney, Agent, or Firm* — Cozen O'Connor

(57) ABSTRACT

A damping valve device for a vibration damper includes a first damping valve that moves into a through-flow operating position in a first operating range with increasing flow velocity of a damping medium. A second operating range with a progressive damping force characteristic is influenced by a throttle point in connection with a valve body that can be transferred into a throttle position. The valve body moves in closing direction with increasing flow velocity of the damping medium and is arranged in series with the damping valve. The valve body is constructed as a ring element with variable diameter that executes a radial closing movement in direction of a flow guide surface in which a defined minimum passage cross section is maintained.

10 Claims, 3 Drawing Sheets

(52) U.S. Cl.
CPC ........... *F16F 9/19* (2013.01); *F16F 2228/066* (2013.01); *F16F 2228/14* (2013.01)

(56) References Cited

U.S. PATENT DOCUMENTS

| | | | |
|---|---|---|---|
| 2003/0006539 A1* | 1/2003 | Bertram | F16F 9/483 267/120 |
| 2009/0321203 A1 | 12/2009 | Widla et al. | |
| 2017/0009840 A1* | 1/2017 | Hertz | F16F 9/49 |
| 2019/0322151 A1* | 10/2019 | Kasprzyk | B60G 17/08 |

FOREIGN PATENT DOCUMENTS

| | | | |
|---|---|---|---|
| DE | 10 2006 005 918 | | 8/2007 |
| DE | 10 2014 203 598 | | 8/2015 |
| EP | 2 233 775 | | 9/2010 |
| ES | 2166696 | * | 4/2002 |

* cited by examiner

DAMPING VALVE DEVICE HAVING A PROGRESSIVE DAMPING-FORCE CHARACTERISTIC CURVE

CROSS REFERENCE TO RELATED APPLICATIONS

This is a U.S. national stage of application No. PCT/EP2017/061554, filed on May 15, 2017. Priority is claimed on German Application No. DE102016210790.9, filed Jun. 16, 2016, the content of which is incorporated herein by reference.

BACKGROUND OF THE INVENTION

1. Field of the Invention

The invention is directed to a damping valve device with a progressive damping force characteristic.

2. Description of the Prior Art

A vibration damper with a progressive damping force characteristic having a damping valve with a throttle valve arranged upstream of the latter is known from DE 10 2004 050 732 A1. The damping valve opens with increasing pressure gradient between the inlet side and the outlet side. The throttle valve has an opposed characteristic. With increasing volume flow, the throttle valve is conveyed into a closing movement. The closing force is determined by the difference in a pressure force and an opposed spring force acting as hold-open force.

The advantage of a damping valve construction of the type described above is that a rise in damping force can be achieved in every piston rod position. Path-dependent tension stops and/or compression stops are not relied on. A substantial disadvantage consists in the additional cost and loss of installation space compared to a conventional vibration damper.

SUMMARY OF THE INVENTION

An object of one aspect of the present invention is to solve the problems known in the prior art.

One aspect of the invention is a valve body constructed as a ring element with variable diameter that executes a radial closing movement in direction of a flow guide surface in which a defined minimum passage cross section is maintained.

A great advantage is that an extremely simple, space-saving component part can be used. There is practically no extra installation space requirement for the valve body. The defined minimum passage cross section prevents a complete blockage of the damping valve device and, therefore, of the working movement of the vibration damper. This valve concept makes use of the effect whereby a radial suction effect is generated after a threshold velocity when a medium flows through a narrow gap. This suction effect results in the radial closing movement of the valve element.

In a variant, the minimum passage cross section is defined through a limit ring. The limit ring is simply positioned in direction of the flow guide surface. A simple snap ring, for example, can be used as limit ring.

Alternatively, it can also be provided that the minimum passage cross section is defined through at least one stop web. The stop web contacts the flow guide surface and accordingly limits the further closing movement.

The ring element has radial pressure compensation channels to promote the radial movability of the ring element.

According to one aspect of the invention the ring element is arranged in a supporting disk of a valve disk equipping of the damping valve. Virtually every damping valve has a supporting disk which, with the implementation of the ring element, exerts an auxiliary function.

Alternatively, the ring element can also be constructed in a tension stop carrier disk. Even the simplest tension stops require a tension stop carrier disk and, accordingly, no further component part reducing the stroke distance need be used for this type of construction.

A further very compact construction is characterized in that the ring element is constructed in fastener of the damping valve.

In the constructions in which the ring element is positioned in the supporting disk or in the tension stop carrier disk, an inner wall of a working cylinder forms the flow guide surface. However, it can also be provided that the ring element cooperates with a piston skirt of a piston as valve body of the damping valve.

Alternatively or in addition, it is possible to construct the ring element as part of a bottom valve.

BRIEF DESCRIPTION OF THE DRAWINGS

The invention will be described in more detail referring to the following description of the figures.

The Drawings Show.

DETAILED DESCRIPTION OF THE PRESENTLY PREFERRED EMBODIMENTS

Figure 1:
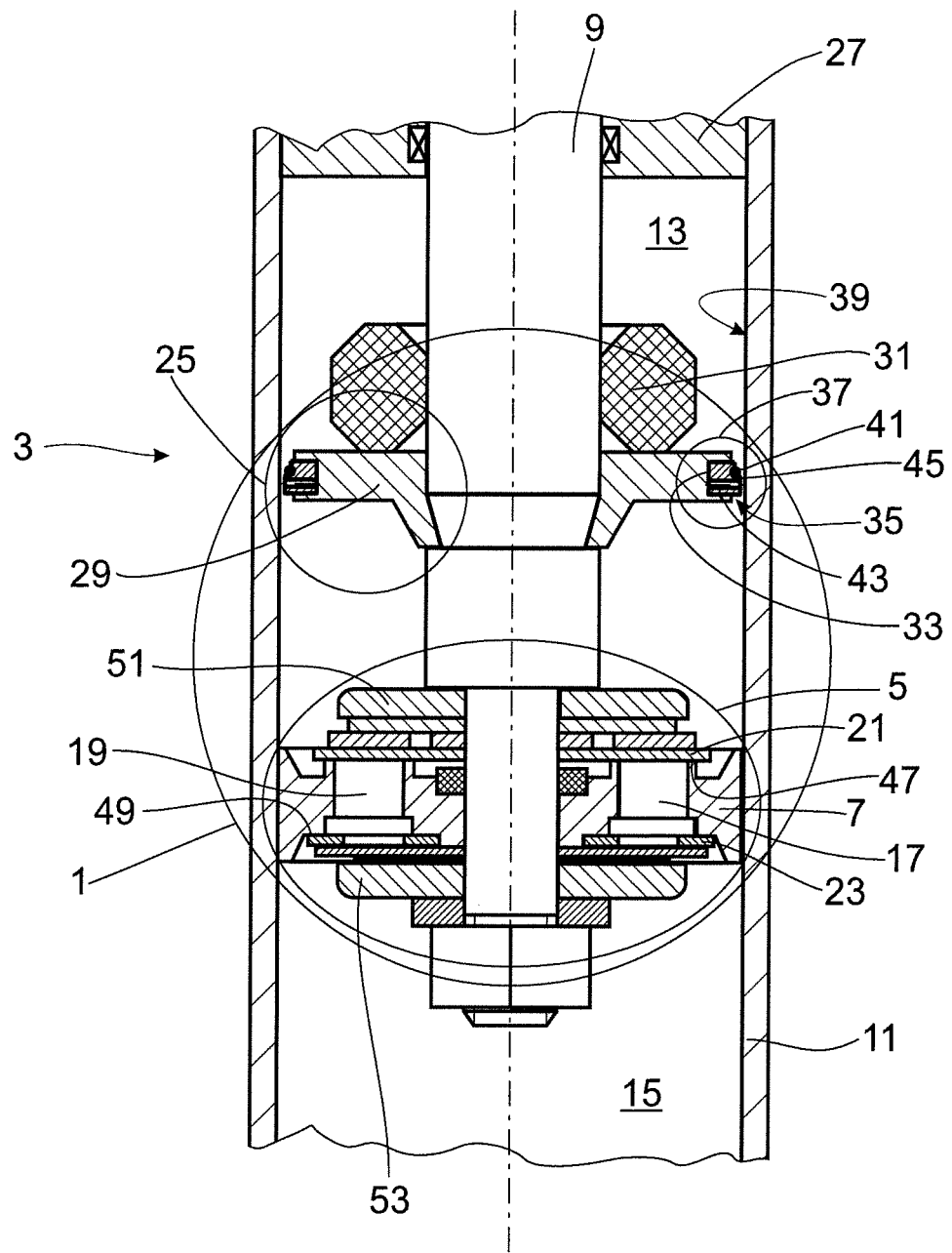
FIG. 1 is a detail from a vibration damper in the area of the damping valve device.

FIG. 1 shows a damping valve device 1 for a vibration damper 3 construction type, shown only in section. The damping valve device 1 comprises a first damping valve 5 with a damping valve body, which is constructed as piston 7 and fastened to a piston rod 9.

The damping valve body 7 divides a cylinder 11 of the vibration damper into a working chamber on the piston rod side and a working chamber remote of the piston rod; both working chambers are filled with damping medium. Through-channels, each for a through-flow direction, are formed on different pitch circles in the damping valve body 7. The arrangement of the through-channels is to be considered only exemplary. An outlet side of the through-channels 17, 19 is at least partially covered by at least one valve disk 21, 23.

The vibration damper has, in addition, a tension stop 25 that comes in abutting contact with a cylinder-side stop surface, e.g., of a piston rod guide 27, after a defined extension movement of the piston rod 9.

The tension stop 25 comprises a tension stop carrier disk 29 fixed directly to the piston rod through a positive engagement connection. An annular elastomeric element 31, for example, is arranged on a top side of the tension stop carrier disk 29 and is held via a slight radial preloading even during a swiveling movement of the piston rod 9. The elastomeric element 31 acts on the stop surface as additional supporting spring proceeding from the stop point.

The tension stop carrier disk 29 has a circumferential groove 33 in which a ring element 35 of variable diameter is guided. This ring element 35 is radially elastic and forms a valve body for a throttle point 37 as part of the damping valve device 1. Ring element 35 forms the throttle point with an inner wall of cylinder 11. The inner wall 39 forms a flow guide surface.

The ring element carries a limit ring 41, e.g., constructed as a retaining ring, at its outer side. Pressure compensation channels 43 are formed radially inside of the ring element and connect an outer lateral surface 45 of the ring element 35 to the one groove base of the circumferential groove 33.

At a piston rod velocity in a first operating range, e.g., less than 2 m/s, the throttle point 37 is completely open. The damping force is then only generated by the through-channels 17, 19 in connection with valve disks 21, 23. When there is an incident flow against valve disks 21, 23, the valve disks 21, 23 lift up from their valve seat surface 47, 49. The lift-off movement is limited by a supporting disk 51, 53, respectively.

In a second operating range with a piston rod velocity that is greater than the threshold velocity of the first operating range, i.e., greater than 2 m/s, which was indicated by way of example, ring element 35 moves into a throttle position and, in so doing, executes a closing movement in direction of the flow guide surface 39. By reason of the high flow velocity of damping medium in the throttle point 37, which is shaped as an annular gap, a negative pressure is formed which leads to a radial widening of ring element 35. But the defined minimum passage cross section of the limit ring 41 is maintained so that a blockage of the throttle point 37 cannot occur under any circumstances.

Figure 2:
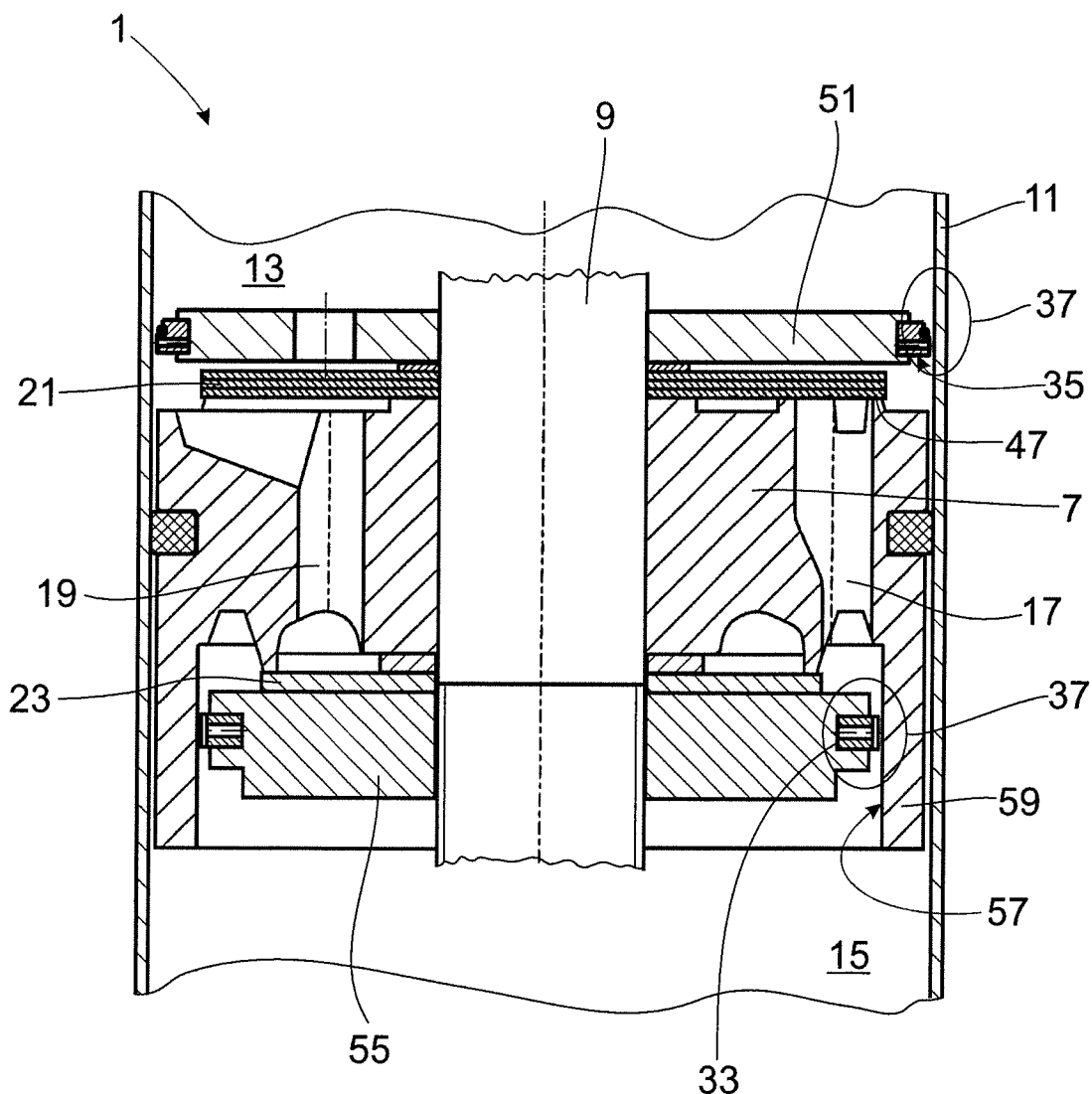
FIG. 2 is an alternative construction to the construction from FIG. 1.

FIG. 2 shows an alternative construction of a first damping valve with a damping valve body 7 produced by sintering technique. The first damping valve functions in a manner completely identical to that described referring to FIG. 1.

FIG. 2 shows ring element 35 inside the supporting disk 51 for the valve disk equipping, i.e., for the valve disks 21.

FIG. 2 shows a second possible variant for integrating the throttle point 37 inside the damping valve device 1. The ring element 35 is formed inside the groove 33 of fastener for fastening the damping valve body 7 to the piston rod. An inner wall of a piston skirt 59 of the damping valve body 45 serves a flow guide surface.

Figure 3:
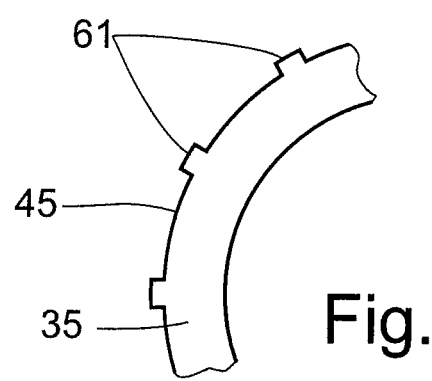
FIG. 3 is an alternative construction of a ring element.

FIG. 3 shows an alternative to the limit ring 41. A stop web 61, which is integral with the outer lateral surface 45 of ring element 35, is shown in the top view of ring element 35 and which can be constructed as an elastomeric component part or as a slit ring. This stop web 61 abuttingly contacts the flow guide surface, i.e., the inner wall 39, 57 of cylinder 11 or of piston skirt 59, and likewise prevents complete blockage of the throttle point 37. By cooperation with the piston skirt 59, as in the embodiment with limit ring 41, no additional frictional force, chiefly through contact with the inner wall 39 of cylinder 11, would occur.

Figure 4:
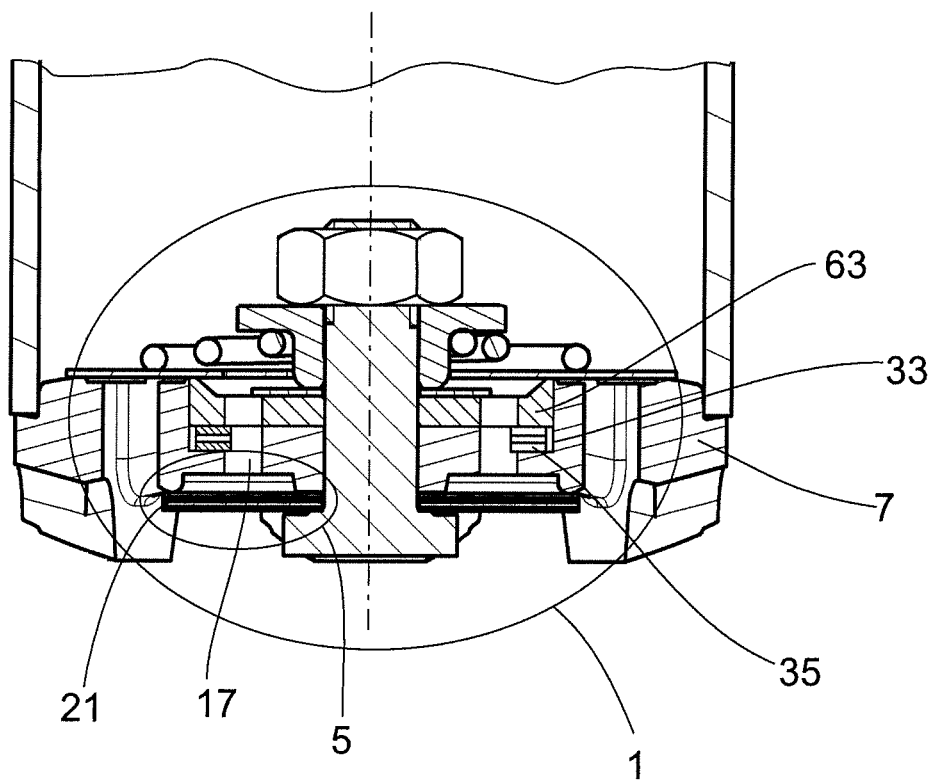
FIG. 4 is a damping valve device as bottom valve.
Figure 5:
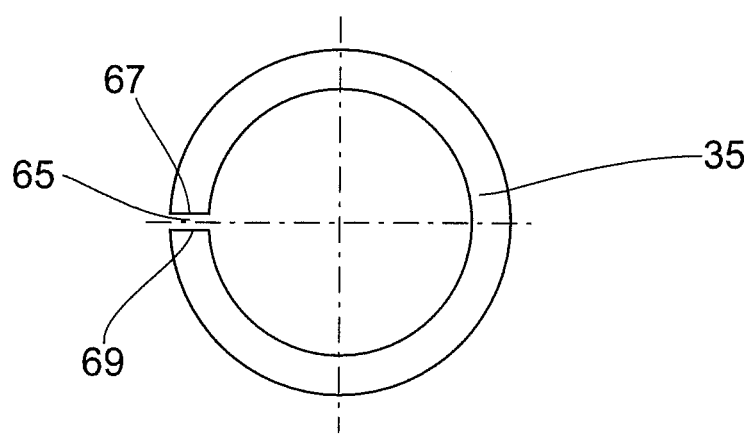
FIG. 5 is the ring element from FIG. 4.

FIGS. 4 and 5 show the application of the invention in a damping valve device 1 constructed as a bottom valve. The damping valve body 7 has groove 33 in which ring element 35 is accommodated. Groove 33 extends radially into through-channels 17 for the first damping valve 5. Via a cover disk 63, the ring element 35 is held axially and a groove side wall is formed. In this variant, the inner diameter of ring element 35 is reduced at a flow velocity in the second operating range. The through-channels 17 form the flow guide surfaces. The slot geometry is dimensioned such that a complete blockage of the through-channels 17 cannot occur. In practice, end faces 67, 69 forming a slot 63 come into contact.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve device for a vibration damper, comprising:
 a throttle point;
 a valve body constructed as a ring element with variable diameter that executes a radial closing movement in direction of a flow guide surface in which a defined minimum passage cross section is maintained;
 a first damping valve that moves into a through-flow operating position in a first operating range with increasing flow velocity of a damping medium, wherein a second operating range with a progressive damping force characteristic is influenced by the throttle point in connection with the valve body, which can be transferred into a throttle position; and
 a limit ring arranged on an outer circumferential surface of the annular valve body,
 wherein the valve body moves in a closing direction with an increasing flow velocity of the damping medium, and
 wherein the valve body is arranged in series hydraulically with the first damping valve.

2. The damping valve device according to claim 1, wherein the defined minimum passage cross section is defined by the limit ring.

3. The damping valve device according to claim 1, wherein the defined minimum passage cross section is defined by at least one stop web.

4. The damping valve device according to claim 1, wherein the ring element has radial pressure compensation channels.

5. The damping valve device according to claim 1, wherein the ring element is arranged in a supporting disk of a valve disk of the first damping valve.

6. The damping valve device according to claim 1, wherein the ring element is a tension stop carrier disk.

7. The damping valve device according to claim 1, wherein the ring element is constructed in fasteners of the first damping valve.

8. The damping valve device according to claim 7, wherein the ring element cooperates with a piston skirt of a piston as the valve body of the first damping valve.

9. The damping valve device according to claim 1, wherein the ring element is part of a bottom valve.

10. The damping valve device according to claim 1, wherein the vibration damper comprises a cylinder having a constant diameter in which the damping valve device is arranged.

\* \* \* \* \*